United States Patent
Salman et al.

(10) Patent No.: US 8,560,165 B2
(45) Date of Patent: Oct. 15, 2013

(54) CO-OPERATIVE ON-BOARD AND OFF-BOARD COMPONENT AND SYSTEM DIAGNOSIS AND PROGNOSIS

(75) Inventors: Mutasim A. Salman, Rochester Hills, MI (US); Yilu Zhang, Northville, MI (US); Mark N. Howell, Rochester Hills, MI (US); Xidong Tang, Royal Oak, MI (US); Youseff A. Ghoneim, Rochester, MI (US); Walter A. Dorfstatter, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 13/351,473

(22) Filed: Jan. 17, 2012

(65) Prior Publication Data

US 2013/0184929 A1 Jul. 18, 2013

(51) Int. Cl.
*G01M 17/00* (2006.01)
*G06F 7/00* (2006.01)
*G06F 19/00* (2011.01)

(52) U.S. Cl.
USPC .......................................................... 701/31.5

(58) Field of Classification Search
USPC .......................................................... 701/31.5
See application file for complete search history.

(56) References Cited

U.S. PATENT DOCUMENTS

| | | | |
|---|---|---|---|
| 6,225,898 B1 * | 5/2001 | Kamiya et al. | 340/505 |
| 6,330,499 B1 | 12/2001 | Chou et al. | |
| 6,339,736 B1 | 1/2002 | Moskowitz et al. | |
| 6,429,773 B1 * | 8/2002 | Schuyler | 340/425.5 |
| 6,745,151 B2 | 6/2004 | Marko et al. | |
| 6,853,894 B1 * | 2/2005 | Kolls | 701/31.4 |
| 6,895,310 B1 * | 5/2005 | Kolls | 701/1 |
| 6,941,202 B2 | 9/2005 | Wilson et al. | |
| 7,155,321 B2 | 12/2006 | Bromley et al. | |
| 7,228,211 B1 * | 6/2007 | Lowrey et al. | 701/31.5 |
| 7,502,672 B1 * | 3/2009 | Kolls | 701/31.6 |
| 7,729,825 B2 | 6/2010 | Chigusa | |
| 8,160,547 B2 * | 4/2012 | Yi et al. | 455/410 |
| 8,190,322 B2 * | 5/2012 | Lin et al. | 701/31.5 |
| 8,285,439 B2 * | 10/2012 | Hodges | 701/31.5 |
| 8,301,330 B2 * | 10/2012 | Nielsen | 701/29.1 |
| 8,386,115 B2 * | 2/2013 | McCutchen et al. | 701/29.1 |
| 2004/0090121 A1 | 5/2004 | Simonds et al. | |
| 2004/0176887 A1 | 9/2004 | Kent et al. | |
| 2005/0102074 A1 * | 5/2005 | Kolls | 701/29 |
| 2005/0125117 A1 * | 6/2005 | Breed | 701/29 |
| 2006/0149519 A1 * | 7/2006 | Keller | 703/8 |
| 2006/0271255 A1 | 11/2006 | Stott et al. | |
| 2009/0055339 A1 * | 2/2009 | Bernard | 706/46 |
| 2009/0240390 A1 * | 9/2009 | Nenadic et al. | 701/31 |
| 2010/0026306 A1 | 2/2010 | Zhang et al. | |
| 2010/0063668 A1 | 3/2010 | Zhang et al. | |
| 2010/0087984 A1 | 4/2010 | Joseph | |
| 2010/0228423 A1 | 9/2010 | Howell et al. | |
| 2011/0046842 A1 | 2/2011 | Smith | |
| 2011/0172874 A1 | 7/2011 | Patnaik et al. | |

* cited by examiner

*Primary Examiner* — Mary Cheung
*Assistant Examiner* — Frederick Brushaber

(57) ABSTRACT

A cooperative diagnostic and prognosis system for generating a prognosis of at least one component in a vehicle. An in-vehicle diagnostic unit determines a diagnostic signature of the component each time an occurrence of a condition is triggered and transmits the diagnostic signature to an off-board diagnostic unit. The off-vehicle diagnostic unit determines a SOH of the component and a rate-of-change in the SOH of the component. The off-vehicle diagnostic unit determines whether the rate-of-change in the SOH is greater than a threshold. The off-vehicle diagnostic unit requests additional information from the vehicle in response to the rate-of-change in the SOH being greater than the threshold. The additional information relating to operating parameter data associated with the component. The off-vehicle diagnostic unit receives the requested information and predicts a time-to-failure of the component.

21 Claims, 2 Drawing Sheets

US 8,560,165 B2

CO-OPERATIVE ON-BOARD AND OFF-BOARD COMPONENT AND SYSTEM DIAGNOSIS AND PROGNOSIS

BACKGROUND OF INVENTION

An embodiment relates generally to remote vehicle diagnostics and prognostics.

Vehicles include monitoring systems which utilize sensor data and operating parameter data for determining whether a component or system is operating properly. Some controllers within the vehicle include diagnostic which analyze the sensed data and determine the health of a system. Examples of such systems may include battery monitoring systems which may determine the state-of-health of a battery or fuel delivery systems. In such cases, the vehicle must maintain all sensed data in memory for analyzing and determining the state-of-health of the system particularly if history data is utilized. In such cases, this requires that a sufficient amount of memory and sufficient processing power is used to process the data.

Off-board diagnostic and prognostic systems are utilized to remotely diagnose and predict faults occurring in vehicles. The advantages of off-board diagnostic systems are that these systems are not typically limited by storage space and can accommodate cooling systems for ventilation where high speed processors are utilized. The disadvantage of such systems is that there is a constant transmission of large amounts of data between the vehicle and the off-board diagnostic system where much of the data may not be utilized. Such a data dump creates inefficiencies and slows down the system.

SUMMARY OF INVENTION

An advantage of an embodiment is the prognosis of a component or system of a vehicle by cooperatively utilizing both on-board and off-board diagnostic units. A degradation signature of a component or system is determined by an on-board processor upon an occurrence of a triggering condition. The triggering condition may be a time-triggered condition or may be an event-triggered condition. The degradation signature is determined and transmitted to the off-board diagnostic unit each time the triggered condition occurs. The off-board diagnostic unit determines and analyzes a state-of-health and either modifies the triggered conditions (e.g., increasing the frequency for determining the degradation signature) or requests additional information (e.g., operating parameter data) for performing a more in-depth analysis of the monitored component/system for determining a prognosis of the time-to-failure.

An embodiment contemplates a cooperative diagnostic system for generating a prognosis of at least one component in a vehicle. An in-vehicle diagnostic unit determines a degradation signature of the at least one component each time an occurrence of a condition is triggered. An off-vehicle diagnostic unit receives the degradation signature and determines a state-of-health of the at least one component as a function of the degradation signature. The determined degradation signature of the at least one component is wirelessly transmitted to the off-vehicle diagnostic unit upon the occurrence of the triggered condition. The off-vehicle diagnostic unit determines a rate-of-change in the state-of-health of the at least one component. The off-vehicle diagnostic unit determines whether the rate-of-change in the state-of-health is greater than a threshold. The off-vehicle diagnostic unit requests additional information from the vehicle in response to the rate-of-change in the state-of-health being greater than the threshold. The additional information relates to operating parameter data associated with the at least one component. The off-vehicle diagnostic unit receives the requested information and predicts a time-to-failure of the at least one component.

DETAILED DESCRIPTION

Figure 1:
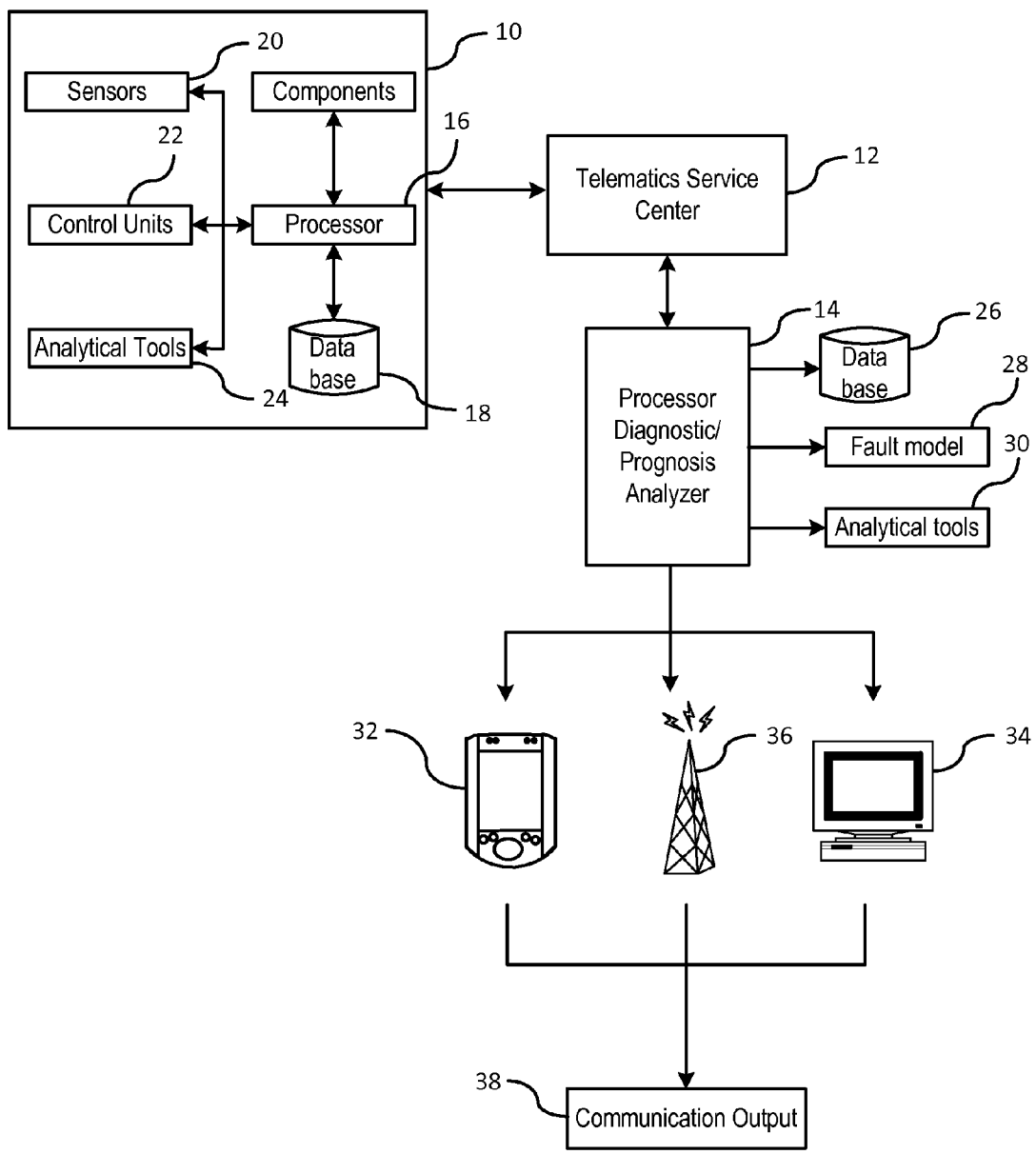
FIG. 1 is a block diagram enhanced diagnosis and prognosis system.

There is shown in FIG. 1 a vehicle 10 in communication with a telematics center 12. The vehicle 10 and the telematics center 12 communicate through a wireless link. The telematics center 12 is also in communication with off-board diagnostic unit 14. The off-board diagnostic unit 14 monitors and generates a prognosis of at least one monitored component 15 based on information provided from the vehicle 10.

The vehicle 10 includes an on-board diagnostic unit 16 for determining a degradation signature of the monitored component 15. It should be understood that although the term "component" is used herein, the monitoring and prognosis may apply to any device, circuit, microcontroller, control unit, sensor, actuator, module, subsystem, or system within the vehicle. Degradation signature characterizes and quantifies a size or level of degradation associated with the component. The degradation signature can be represented as a scaled number, a vector, a graph, or other like representation. The on-board diagnostic unit 16 is connected to a storage database 18, a plurality of sensors 20, control units 22, and analytical tools 24 within the vehicle. Each of the respective devices coupled to the on-board diagnostic unit 16 provide data relating to the operation of the component 15 for determining the degradation signature of the component 15. For example, data from sensors may include, but is not limited to, voltages, current, speed, and flow rates. Electronic control units may collect data, diagnostic trouble codes (DTCs), parameter data, or may formulate a diagnosis of a respective component 15 or system which may be used in determining the degradation signature (e.g., a battery control module may determine a state-of-charge of a battery that can be used for determining a state-of-health of the battery). In addition, analytical tools such as diagnostic reasoners may be utilized for identifying the degradation signature.

The on-board diagnostic unit 16 utilizes data from the various in-vehicle devices for determining a degradation signature of the monitored component 15. The degradation signature of a component 15 is often determined by analyzing a current condition of the component 15 in comparison to the component's ideal condition. The specific parameters that are used to analyze the degradation signature may be specific to each monitored component 15.

The on-board diagnostic unit 16 determines the degradation signature of the component 15 based on a trigger condition. The trigger condition may occur in response to a time-triggered condition or an event-triggered condition. In a time-triggered condition, the degradation signature is determined when a frequency of time or a frequency of the condition occurring. That is, the degradation signature is determined based on a periodic schedule. A periodic schedule may include a straight forward timing (e.g., every 72 hours) or may be cyclic (e.g., every n-number of engine start cycles). Under an event-triggered condition, the degradation signature is determined based on an occurrence of the event (e.g., whenever the vehicle is started).

After a degradation signature is determined based on the trigger condition, the degradation signature is wirelessly transmitted to the off-board diagnostic unit 14 via the telematics center 12. The telematics center 12 may utilize a wireless communication system that includes, but is not limited to, an ad-hoc communication network for relaying information between the on-board diagnostic unit 16 and the off-board diagnostic unit 14.

The off-board diagnostic unit 14 includes a storage database 26 for storing the degradation signature and other information received by the on-board diagnostic unit 16. The off-board diagnostic unit 14 is connected to a fault model and diagnostic reasoner 28 and other analytical tools 30 which assist in isolating the root cause of the fault and facilitating a prognosis of the monitored component 15.

The off-board diagnostic unit 14 receives the degradation signature from the on-board diagnostic unit 16 and determines a state-of-health (SOH) of the monitored device. The SOH and associated degradation signature and data are stored in the storage database 26. The off-board diagnostic unit 14 determines a rate-of-change in the SOH of the component 15. The rate-of-change may include two consecutive received SOH determinations, a selected group of the SOH determinations, or the entire history of the received SOH determinations. The rate-of-change is preferably generated as an absolute value result thereby compensating for negative values. The rate-of-change in the SOH is compared to one or more thresholds. The various thresholds represent the severity of the condition of the component 15, and based on the severity, determinations are made whether additional information is required or a modification as to the frequency in the monitoring of the SOH should be made. For example, the rate-of-change in the SOH is compared to a first threshold for identifying a severity level. Based on a severity level, additional information may be needed to further assess the SOH and time-to-failure. Under such conditions, the off-board diagnostic module 14 requests additional information from the vehicle 10 for generating a prognosis of the time-to-failure. The additional information may include operating parameter data associated with the at least one component 15. Operating parameter data may include, but is not limited to, snapshots of system parameters such as signature fault information voltage, current, pressure, flow rates, additional SOH related data, DTCs, and parameter identification data (PIDs). The off-board diagnostic unit 14 may select which additional information should be provided from the vehicle 10. Therefore, the off-board diagnostic unit 14 receives only that information that it deems pertinent for determining the time-to-failure of the component 15 as opposed to receiving non-essential data. The thresholds may be generated based on history data and may be adaptively modified based on ongoing collected data. For example, for a new production vehicle, data may be extensively collected from the vehicle itself and/or collectively from a fleet of vehicles of the same model vehicle for generating the baseline thresholds. After the baseline thresholds are established, data may be collected at a lesser rate for detecting whether any shifts have occurred in the data (e.g., due to aging of the vehicle or increased mileage) which would require that thresholds be adaptively modified. Moreover, the thresholds may be adaptively modified when taking into consideration past diagnoses where false-positives and false-negatives occurred.

If the rate-of-change in the SOH is not of a severity level that requires additional information for assessing the time-to-failure of the component 15, the SOH is compared to a second threshold. Under such conditions, the off-board diagnostic module 14 determines whether the frequency of the degradation signature provided by the on-board diagnostic module 10 should be increased. For example, the severity level does not warrant determining a time-to-failure; however, the rate-of-change in the SOH shows signs of degradation for which the SOH should be monitored more frequently that what is currently performed. Therefore, the frequency of the degradation signature as generated and reported to the off-board diagnostic unit 14 is increased. This may be performed by shortening the interval between the transmissions of the degradation signature or increasing a duty cycle at which the degradation signature is provided.

If the rate-of-change in the SOH is not of a level that requires a change in the frequency of the reported degradation signature, then the system will continue to transmit the degradation signature at the current transmission rate. This would indicate that the component 15 is operating properly and degradation is as expected.

Alternatively, the on-board diagnostic unit 16 may autonomously transmit the degradation signature if the on-board diagnostic unit 16 determines that the degradation signature is severely degraded beyond a respective operating threshold. In such a case, it is unwarranted to wait until the timing event occurs; rather, due to the severity of the degradation signature as determined by the on-board diagnostics, the degradation signature is transmitted immediately.

Referring to the condition where the severity level requires additional data, after receiving the additional information and determining a time-to-failure, the time-to-failure is communicated to the user of the vehicle using a respective mode of communication 32. The mode of communication 32 may include, but is not limited to, cell phone communication 34, internet-based communications 36, or any other wireless communication 38. Moreover, notification to the user of the time-to-failure may be communicated through a third party such as dealership service department. In block 39, the information is output to the user using an output device or vehicle interface device.

Figure 2:
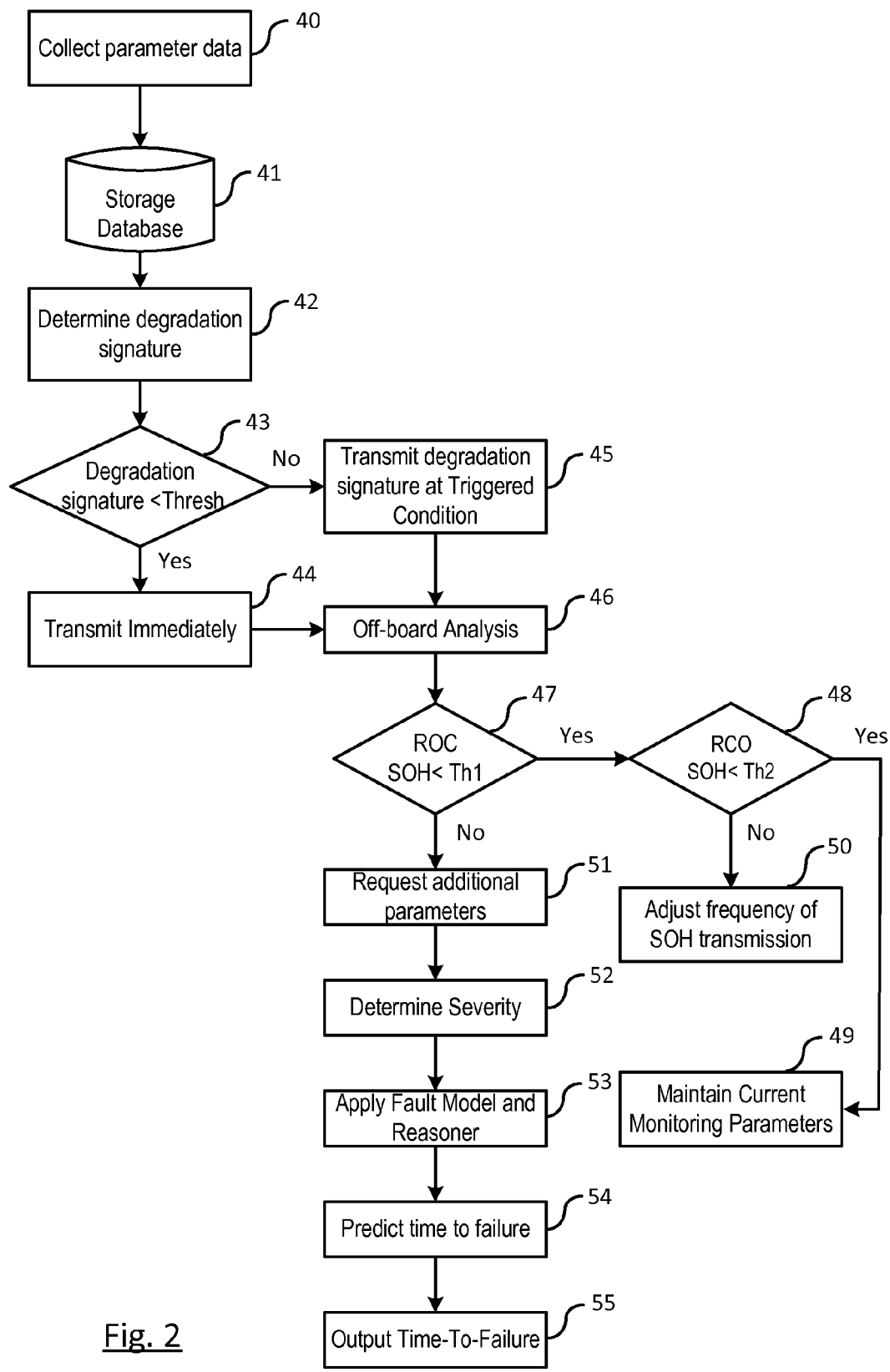
FIG. 2 is a flowchart of a method for predicting a time-to-failure.

FIG. 2 illustrates a flowchart of a method for predicting a time-to-failure. In step 40, parameter data is collected by the vehicle. Sensors and other devices monitor the vehicle operating conditions for a component, subsystem, and system.

In step 41, the parameter data is collected and stored in a memory storage device. The memory storage device may be integral to the on-board diagnostic unit, may be an independent vehicle-based storage database separate from the on-board diagnostic unit, or may be a shared storage database.

In step 42, a degradation signature of the monitored component is determined.

In step 43, a determination is made whether the degradation signature is less than an operating threshold. If the degradation signature is less than an operating threshold, then degradation signature is immediately transmitted to the off-board diagnostic unit in step 44. If the degradation signature is greater than an operating threshold, then the on-board diagnostic unit communicates the degradation signature to the off-board diagnostic unit upon the occurrence of the triggered condition in step 45. It should be understood that the degradation signature may be determined by the on-board diagnostic system more frequently than the scheduled transmission based on the triggered condition.

In step 46, the off-board diagnostic unit receives the degradation signature and determines the SOH of the monitored device. The off-board diagnostic unit determines a rate-of-change in the SOH based on the cumulative SOH stored in the off-vehicle storage database. The rate-of-change may be based off of any number of SOH determinations maintained in the storage database. For example, the rate-of-change may be based on the last two SOH determinations, or may be based a select number of SOH determinations within a respective time frame, or may include the entire history of SOH determinations maintained in the storage database for the monitored component In step 47, the off-board diagnostic unit compares the rate-of-change in the SOH to a first threshold. If the rate-of-change is less than the first threshold, then a determination is made that the rate-of-change has degraded but not to a severity level that requires that a time-to-failure be generated. In response to the rate-of-change being less than the first threshold, the routine proceeds to step 48.

In step 48, a determination is made whether the rate-of-change in the SOH is less than a second threshold. If the determination is made that the rate-of-change is less than the second threshold, then the routine proceeds to step 49 where no modifications are made in the monitoring process. This indicates that the component is operating properly and no adjustments are made to the frequency at which the degradation signature is transmitted. If the determination is made that the rate-of-change in the SOH is not less than the second threshold, then the routine proceeds to step 50.

In step 50, in response to the determination that the rate-of-change in the SOH is not less than the second threshold, the trigger condition is modified. This may include modifying the frequency at which the degradation signature is transmitted to the off-board diagnostic unit. Modifying the frequency may include increasing the duty cycle time at which the degradation signature is transmitted or changing the event which provides increases the rate at which the degradation signature is transmitted. For example, if the degradation signature is determined every ten ignitions starts, then the frequency may be changed to every five ignition starts.

Referring again to step 47, if the rate of change in the SOH is less than the first threshold, then the routine proceeds to step 51. In step 51, a determination is made that the SOH has degraded significantly where additional analysis of the operating condition of the component is required beyond that of the degradation signature is provided by the on-board diagnostic unit, and the off-board diagnostic unit requests additional information from the vehicle. The additional information is communicated through the telematics center. The additional information may include specific operating parameters relating to the operation of the component. The purpose of requesting specific parameters is to allow the off-board diagnostic unit to analyze only that information that it deems necessary to further assess the SOH of the component. Performing a data dump on non-essential information would create inefficiencies in transmitting the data if a large amount of data is transmitted and would result in the processor sorting through the data for determining which information is pertinent. Such inefficiencies create delays in its assessment of the component, particularly if the SOH health for multiple components is being assessed.

In step 52, a severity of the SOH is determined based on the additional data supplied by the vehicle.

In step 53, a fault model and diagnostic reasoner is utilized for determining the expected fault and root cause. In addition, trend analysis from past history of failed components and other analytical tools may be utilized to predict a time-to-failure.

In step 54, a time-to-failure is generated. The time-to-failure may provide the detailed information regarding the component, what the potential cause of the fault is, and the expected remaining useful life for the component.

In step 55, the time-to-failure information is output to the user. The information may be output utilizing various methods which include, cell phones, text messages, email, web-based communications, other wireless communications, vehicle interface device, or through a dealership notification program. Moreover, the time-to-failure may be communicated through the telematics center.

While certain embodiments of the present invention have been described in detail, those familiar with the art to which this invention relates will recognize various alternative designs and embodiments for practicing the invention as defined by the following claims.

What is claimed is:

1. A cooperative diagnostic system for generating a prognosis of at least one component in a vehicle, the system comprising:
   an in-vehicle diagnostic unit determining a degradation signature of the at least one component each time an occurrence of a condition is triggered; and
   an off-vehicle diagnostic unit receiving the degradation signature and determining a state-of-health of the at least one component as a function of the degradation signature;
   wherein the determined degradation signature of the at least one component is wirelessly transmitted to the off-vehicle diagnostic unit upon the occurrence of the triggered condition, the off-vehicle diagnostic unit determining a rate-of-change in the state-of-health of the at least one component, the off-vehicle diagnostic unit determining whether the rate-of-change in the state-of-health is greater than a threshold, the off-vehicle diagnostic unit requesting additional information from the vehicle in response to the rate-of-change in the state-of-health being greater than the threshold, the additional information relating to operating parameter data associated with the at least one component, the off-vehicle diagnostic unit receiving the requested information and predicting a time-to-failure of the at least one component.

2. The system of claim 1 wherein each determined state-of-health is stored in an off-vehicle diagnostic unit memory, wherein the off-vehicle diagnostic unit collectively analyzes the stored state-of-health determinations for determining the rate-of-change in the state-of-health.

3. The system of claim 2 wherein the triggered condition includes a time-triggered condition, wherein the off-board diagnostic unit determines an increase in a frequency of the timed condition based on a rate-of-change in the state-of-health being greater than a second threshold.

4. The system of claim 3 wherein increasing the frequency of the time triggered condition is based on an incremental rate-of-change in the state-of-health between two state-of-health determinations.

5. The system of claim 3 wherein increasing the frequency of the time triggered condition is based on an incremental rate-of-change in the state-of-health between two consecutive state-of-health determinations.

6. The system of claim 3 wherein increasing the frequency of the time-triggered condition is based on an incremental rate-of-change in the state-of-health between a plurality of state-of-health determinations.

7. The system of claim 2 wherein the triggered condition includes an event-triggered condition that is based on an occurrence of an event.

8. The system of claim 2 wherein the on-board diagnostic unit compares the determined degradation signature to an operating threshold, and wherein diagnostic unit transmits the determined degradation signature to the off-board diagnostic unit in response to the determined degradation signature being greater than the operating threshold.

9. The system of claim 1 further comprising a telematics center, wherein messages from the vehicle are relayed to the on-board diagnostic unit.

10. The system of claim 1 wherein the telematics center relays messages from off-board diagnostic unit to the vehicle.

11. The system of claim 1 wherein the off-vehicle diagnostic unit selects which additional information is requested from the vehicle.

12. The system of claim 1 wherein the off-vehicle diagnostic unit utilizes a diagnostic reasoner for predicting the fault in the at least one component and predicting the time-to-failure.

13. The system of claim 1 wherein the off-vehicle diagnostic unit utilizes a fault model for predicting the fault in the at least one component and predicting the time-to-failure.

14. The system of claim 1 wherein the prognosis determined by the off-board diagnostic unit is output to a user of the vehicle.

15. The system of claim 14 further comprising a texting device for outputting the prognosis to the user.

16. The system of claim 14 further comprising a cell phone for outputting the prognosis to the user.

17. The system of claim 14 further comprising a vehicle-based output device for outputting the prognosis to the user.

18. The system of claim 14 wherein the prognosis is output using email.

19. The system of claim 14 wherein a third party outputs the prognosis to the user.

20. The system of claim 19 wherein the third party is a vehicle dealership.

21. The system of claim 19 wherein the third party is a telematics center.

* * * * *